US012151576B2

(12) United States Patent
Ishihara

(10) Patent No.: US 12,151,576 B2
(45) Date of Patent: Nov. 26, 2024

(54) ROTATION ANGLE DETECTING APPARATUS AND POWER TRANSMISSION AND RECEIVING SYSTEM FOR VEHICLE

(71) Applicant: TOYOTA JIDOSHA KABUSHIKI KAISHA, Toyota (JP)

(72) Inventor: Hiroyuki Ishihara, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 504 days.

(21) Appl. No.: 17/694,886

(22) Filed: Mar. 15, 2022

(65) Prior Publication Data
US 2022/0297562 A1 Sep. 22, 2022

(30) Foreign Application Priority Data

Mar. 22, 2021 (JP) ................... 2021-047450

(51) Int. Cl.
*B60L 53/38* (2019.01)
*B60L 53/12* (2019.01)
(Continued)

(52) U.S. Cl.
CPC .............. *B60L 53/38* (2019.02); *B60L 53/12* (2019.02); *H02J 50/90* (2016.02); *B60L 53/36* (2019.02); *B60L 53/37* (2019.02)

(58) Field of Classification Search
CPC .......... B60L 53/38; B60L 53/12; B60L 53/37; B60L 53/36; H02J 50/90
(Continued)

(56) References Cited

U.S. PATENT DOCUMENTS 4,713,767 A * 12/1987 Sato ................. G01C 21/12
340/988
4,777,611 A * 10/1988 Tashiro .............. G01P 1/106
702/183
(Continued)

FOREIGN PATENT DOCUMENTS

DE 102017207085 A1 * 11/2017 .......... B60L 11/1829
EP 2712762 A1 * 4/2014 ........... B60L 53/124
(Continued)

OTHER PUBLICATIONS

Ling, Chinese Patent Document No. CN-110435440-A, published Nov. 12, 2019, 3 pages including abstract, claims and 1 drawing. (Year: 2019).*

*Primary Examiner* — Phallaka Kik
(74) *Attorney, Agent, or Firm* — Oliff PLC

(57) ABSTRACT

In a rotation angle detecting apparatus, a ground unit in a parking space has a linear side facing toward the approaching vehicle, an in-vehicle unit is able to face the ground unit, a processor is configured to, after the vehicle starts parking, acquire a first timing at which one of first and second sensors, arranged in a right and left direction of the vehicle, begins to face the ground unit and a second timing at which the other one begins to face the ground unit based on a change of an output signal of one of the sensors, and to calculate a vehicle moving distance from the first timing to the second timing based on an output signal of a rotation angle sensor and calculate an arc tangent value of a value obtained by dividing the calculated moving distance by a sensor-to-sensor distance as a yaw angle.

9 Claims, 13 Drawing Sheets

(51) Int. Cl.
  *B60L 53/36*    (2019.01)
  *B60L 53/37*    (2019.01)
  *H02J 50/90*    (2016.01)
(58) Field of Classification Search
  USPC ...... 320/108, 109, 113, 104; 701/20, 22, 24,
         701/49, 408, 411, 467, 469; 180/199
  See application file for complete search history.

(56) References Cited

U.S. PATENT DOCUMENTS

| | | | |
|---|---|---|---|
| 2014/0092236 A1* | 4/2014 | Findeisen | ............... B60L 53/16 |
| | | | 348/118 |
| 2017/0245426 A1* | 8/2017 | Kuriyagawa | ...... A01D 34/6806 |
| 2017/0313203 A1 | 11/2017 | Amari | |
| 2018/0287415 A1* | 10/2018 | Saita | ...................... H02J 50/10 |
| 2018/0287416 A1* | 10/2018 | Saita | ...................... H02J 50/90 |
| 2019/0294173 A1* | 9/2019 | Szubbocsev | ......... G05D 1/0274 |

FOREIGN PATENT DOCUMENTS

| | | | | |
|---|---|---|---|---|
| JP | 5199495 B1 * | 5/2013 | | ............ B60L 11/182 |
| JP | 2017200328 A * | 11/2017 | | ......... B60L 11/1829 |
| JP | 6446086 B2 * | 12/2018 | | ............. B60L 53/38 |
| JP | 2020-090254 A | 6/2020 | | |
| JP | 2021-030892 A | 3/2021 | | |
| WO | WO-2018180973 A1 * | 10/2018 | | .............. B60L 50/50 |

\* cited by examiner

ROTATION ANGLE DETECTING APPARATUS AND POWER TRANSMISSION AND RECEIVING SYSTEM FOR VEHICLE

CROSS-REFERENCE TO RELATED APPLICATION

This application claims priority to Japanese Patent Application No. 2021-047450 filed on Mar. 22, 2021, incorporated herein by reference in its entirety.

BACKGROUND

1. Technical Field

The disclosure relates to a rotation angle detecting apparatus that detects a relative rotation angle of an in-vehicle unit with respect to a ground unit, and a power transmission and receiving system for a vehicle.

2. Description of Related Art

Japanese Unexamined Patent Application Publication No. 2017-200328 (JP 2017-200328 A) describes a noncontact power transmission and receiving system for a vehicle. In the power transmission and receiving system, a ground-side primary coil (power transmission coil) transmits electric power to a vehicle-side secondary coil (power receiving coil) in a noncontact manner. In the power transmission and receiving system, the relative position and inclination of the secondary coil with respect to the primary coil are calculated based on a coupling coefficient between the primary coil and the secondary coil and a change in the coupling coefficient over time.

SUMMARY

As described in JP 2017-200328 A, with a technique based on the coupling coefficient, that is, the degree of electromagnetic coupling between two coils, and its change over time, it is presumably difficult to accurately detect the relative rotation angle of the in-vehicle unit with respect to the ground unit in the power transmission and receiving system. On the other hand, detecting the rotation angle with the use of a simple configuration is desired.

The disclosure enables detection of a relative rotation angle of an in-vehicle unit with respect to a ground unit with the use of a simple configuration.

A first aspect of the disclosure relates to a rotation angle detecting apparatus. The rotation angle detecting apparatus detects a relative rotation angle of an in-vehicle unit with respect to a ground unit. The ground unit is one of a power transmission unit and a power receiving unit and is disposed in a parking space. The in-vehicle unit is the other one of the power transmission unit and the power receiving unit and is mounted on a vehicle at a location at which the in-vehicle unit is able to face the ground unit. When the ground unit is viewed from above in a vertical direction, the ground unit has a linear side facing toward the vehicle that approaches the ground unit. The rotation angle detecting apparatus includes a first distance measuring sensor, a second distance measuring sensor, a rotation angle sensor, and a processor. The first distance measuring sensor and the second distance measuring sensor are mounted on the vehicle so as to be arranged in a right and left direction of the vehicle and to face a road surface at a location at which the first distance measuring sensor and the second distance measuring sensor are able to face the ground unit at a time of parking. The rotation angle sensor is configured to detect a rotation angle of a wheel rotary shaft of the vehicle or a rotation angle of a rotary shaft that rotates with the wheel rotary shaft. The processor is configured to, after the vehicle starts parking, acquire a first timing at which one of the first distance measuring sensor and the second distance measuring sensor begins to face the ground unit based on a change of an output signal of the one of the first distance measuring sensor and the second distance measuring sensor. The processor is configured to, after the first timing is detected, acquire a second timing at which the other one of the first distance measuring sensor and the second distance measuring sensor begins to face the ground unit, based on a change of an output signal of the other one of the first distance measuring sensor and the second distance measuring sensor. The processor is configured to calculate a moving distance of the vehicle during a period from the first timing to the second timing based on an output signal of the rotation angle sensor. The processor is configured to calculate an arc tangent value of a value obtained by dividing the calculated moving distance by a distance between the first distance measuring sensor and the second distance measuring sensor as a yaw angle. The yaw angle is a rotation angle of the in-vehicle unit with respect to the ground unit about a vertical axis of the vehicle.

The first distance measuring sensor and the second distance measuring sensor may be installed in the in-vehicle unit.

The rotation angle detecting apparatus may further include a third distance measuring sensor and a fourth distance measuring sensor arranged in the right and left direction and installed in the in-vehicle unit so as to face a road surface. The third distance measuring sensor may be disposed apart from the first distance measuring sensor by a predetermined distance in a front and rear direction of the vehicle. The fourth distance measuring sensor may be disposed apart from the second distance measuring sensor by the predetermined distance in the front and rear direction.

The processor may be configured to calculate a first difference between an average value of a first distance detected by the first distance measuring sensor and a third distance detected by the third distance measuring sensor and an average value of a second distance detected by the second distance measuring sensor and a fourth distance detected by the fourth distance measuring sensor. The processor may be configured to calculate an arc sine value of a value obtained by dividing the calculated first difference by the distance between the first distance measuring sensor and the second distance measuring sensor as a roll angle that is a rotation angle of the in-vehicle unit with respect to the ground unit about a longitudinal axis of the vehicle.

The processor may be configured to calculate a second difference between an average value of a first distance detected by the first distance measuring sensor and a second distance detected by the second distance measuring sensor and an average value of a third distance detected by the third distance measuring sensor and a fourth distance detected by the fourth distance measuring sensor. The processor may be configured to calculate an arc sine value of a value obtained by dividing the calculated second difference by a distance between the first distance measuring sensor and the third distance measuring sensor as a pitch angle that is a rotation angle of the in-vehicle unit with respect to the ground unit about a transverse axis of the vehicle.

The in-vehicle unit may include a power transmission coil or a power receiving coil for transmitting or receiving electric power to or from the ground unit in a noncontact manner. When the in-vehicle unit is viewed in a direction of the vertical axis, the first distance measuring sensor, the second distance measuring sensor, the third distance measuring sensor, and the fourth distance measuring sensor may be disposed so as to surround the power transmission coil or the power receiving coil disposed in the in-vehicle unit.

The rotation angle sensor may be a resolver configured to detect a rotation angle of a rotary shaft of an electric motor that drives the vehicle.

A second aspect of the disclosure relates to a power transmission and receiving system for a vehicle. The power transmission and reception system includes the rotation angle detecting apparatus. The power transmission and receiving system may be configured to transmit or receive electric power between the power transmission unit and the power receiving unit in a noncontact manner.

With the rotation angle detecting apparatus and the power transmission and receiving system including the rotation angle detecting apparatus according to the aspects of the disclosure, the yaw angle of the in-vehicle unit with respect to the ground unit can be detected with the use of a simple configuration made up of a pair of distance measuring sensors (the first and second distance measuring sensors) and the rotation angle sensor of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In the following embodiments, when the number, count, amount, or range of each element is referred to, the technical idea according to the disclosure is not limited thereto unless otherwise specified or apparently determined to that in principle. The structures, steps, and the like, that will be described in the following embodiments, are not always indispensable to the technical idea according to the disclosure unless otherwise specified or apparently determined to them in principle.

Figure 1:
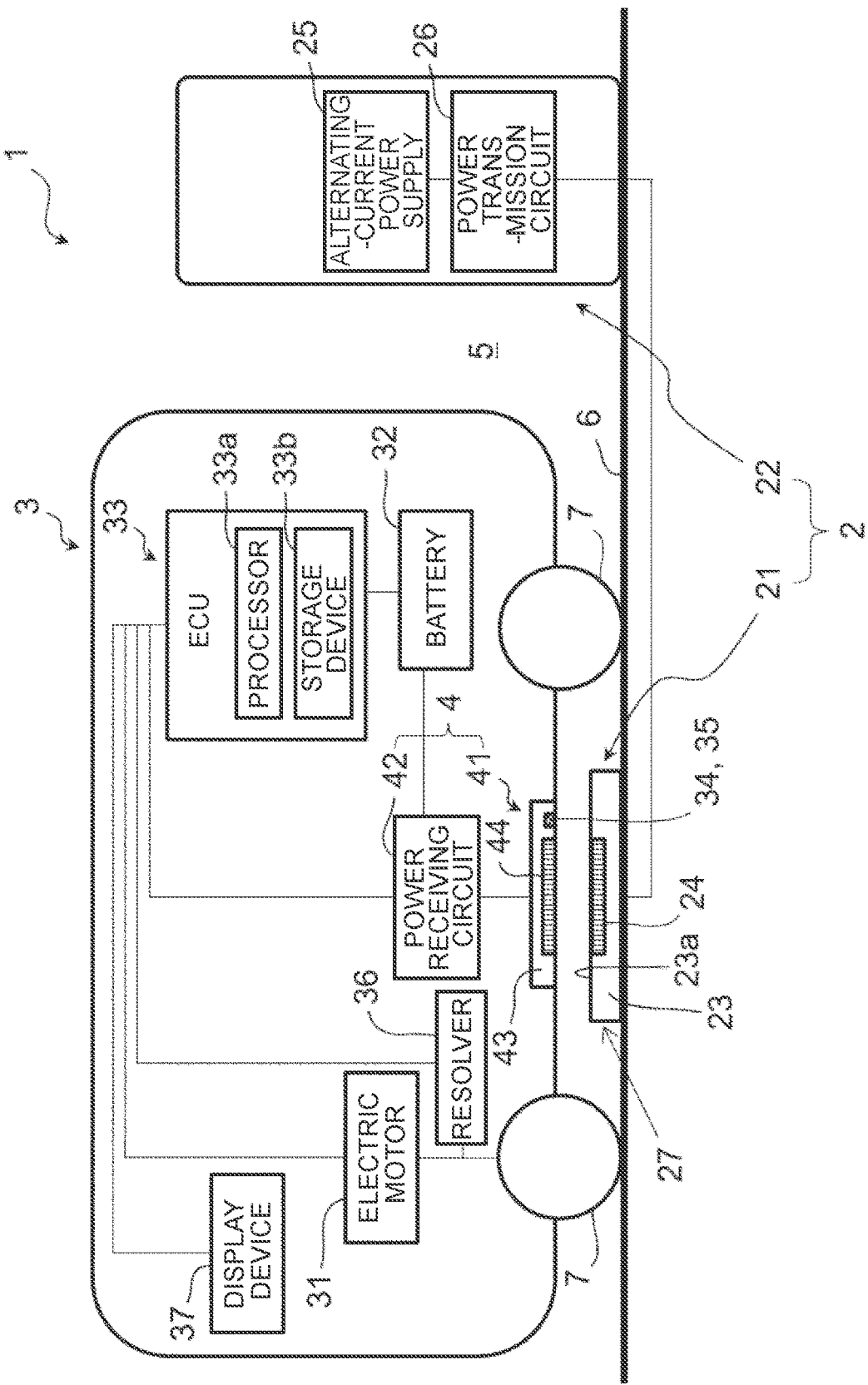
FIG. 1 is a diagram schematically showing an example of the configuration of a power transmission and receiving system for a vehicle, to which a rotation angle detecting apparatus according to a first embodiment is applied.

1. First Embodiment 1-1. Configuration Example of Power Transmission and Receiving System for Vehicle FIG. 1 is a diagram schematically showing an example of the configuration of a power transmission and receiving system 1 for a vehicle, to which a rotation angle detecting apparatus 50 according to a first embodiment is applied. The power transmission and receiving system 1 includes a power transmission apparatus 2 installed at a ground side, and a power receiving apparatus 4 mounted on a vehicle 3. The power transmission and receiving system 1 is configured to transfer electric power from the power transmission apparatus 2 to the power receiving apparatus 4 by using, for example, a magnetic field resonance system. However, a noncontact power transfer system is not limited, and another system, such as an electromagnetic induction system, may be used.

The power transmission apparatus 2 is installed in a parking space 5 of the vehicle 3. The power transmission apparatus 2 includes a power transmission unit (hereinafter, also referred to as ground unit) 21. The power transmission apparatus 2 is made up of the ground unit 21 and a power transmission station 22 as an example.

The ground unit 21 includes a case 23. The case 23 accommodates a power transmission coil 24. The power transmission station 22 is electrically connected to the ground unit 21. The power transmission station 22 includes an alternating current power supply 25 and a power transmission circuit 26. The alternating current power supply 25 supplies electric power to the ground unit 21 (power transmission coil 24) via the power transmission circuit 26. The power transmission circuit 26 includes an inverter and controls a current flowing through the power transmission coil 24.

As shown in FIG. 1, the ground unit 21 is placed on a road surface 6 and has a step 27 between a top surface 23a and the road surface 6. The height of the step 27 is less than the clearance between the road surface 6 and the bottom surface of the vehicle 3. The ground unit 21 just needs to be disposed on the road surface 6 so as to have the step 27 that can be detected by first and second distance measuring sensors 34, 35 (described later) and may also be, for example, embedded in the road surface 6. The step 27 may be formed such that the top surface 23a is lower than the road surface 6 instead of an example in which the top surface 23a is higher than the road surface 6 as shown in FIG. 1. The power transmission station 22 is installed at, for example, one end of the parking space 5.

The power receiving apparatus 4 mounted on the vehicle 3 includes a power receiving unit (hereinafter, also referred to as in-vehicle unit) 41. The power receiving apparatus 4 is made up of the in-vehicle unit 41 and a power receiving circuit 42 as an example. The in-vehicle unit 41 is mounted on the vehicle 3 at a location at which the in-vehicle unit 41 is able to face the ground unit 21 (that is, the bottom of the vehicle 3). The in-vehicle unit 41 receives electric power transferred from the ground unit (power transmission unit) 21.

The in-vehicle unit 41 includes a case 43. The case 43 accommodates a power receiving coil 44. The power receiving coil 44 receives electric power transferred from the power transmission coil 24 in a noncontact manner in a state of facing the power transmission coil 24. The power receiving circuit 42 includes a rectifier that converts alternating-current power received by the power receiving coil 44 to direct-current power by rectifying the alternating-current power.

The vehicle 3 includes an electric motor 31 serving as a driving source, and a battery 32 that supplies electric power to the electric motor 31 in addition to the power receiving apparatus 4. In other words, the vehicle 3 is an electrically-powered vehicle. Specifically, the vehicle 3 is, for example, a battery electric vehicle. Other examples of the vehicle 3 include a hybrid vehicle including an internal combustion engine together with the electric motor 31 as a driving source, and a fuel cell electric vehicle. The battery 32 is, for example, a lithium ion battery and is connected to the power receiving circuit 42. The battery 32 is charged with electric power supplied from the ground-side power transmission apparatus 2 via the power receiving apparatus 4.

The vehicle 3 includes an electronic control unit (ECU) 33. The ECU 33 is a computer that executes various processes related to the vehicle 3. Specifically, the processes to be executed by the ECU 33 include a process related to control over the electric motor 31, a process related to control over electric power received from the power transmission apparatus 2, and a process related to detecting various rotation angles (yaw angle α in the first embodiment) (described later). The ECU 33 includes a processor 33a and a storage device 33b. The processor 33a reads out a program stored in the storage device 33b and runs the program. Thus, the above-described various processes are implemented by the processor 33a. A plurality of the ECUs 33 may be provided. For example, the process related to detecting a yaw angle α may be executed by a dedicated ECU (processor).

The vehicle 3 includes the pair of distance measuring sensors (first and second distance measuring sensors) 34, 35 and a resolver 36 in order to detect a yaw angle α. The details of the distance measuring sensors 34, 35 will be described later with reference to FIG. 5.

The resolver 36 detects the rotation angle of the rotary shaft of the electric motor 31. The rotary shaft of the electric motor 31 may be regarded as an example of a rotary shaft that rotates in synchronization with the rotary shafts of wheels 7 of the vehicle 3. Therefore, the ECU 33 is capable of calculating a moving distance of the vehicle 3 based on the rotation angle of the electric motor 31 (more specifically, the rotation angle, a gear ratio between the electric motor 31 and each wheel 7, and the radius of each wheel 7 (tire)). The resolver 36 may be regarded as an example of a rotation angle sensor according to the disclosure. The rotation angle sensor may be, for example, a wheel speed sensor that detects the rotation angle of the rotary shaft of any one of the wheels 7 instead of the resolver 36. In addition, the resolver 36 used to detect a rotation angle required to control the electric motor 31 is generally capable of detecting a rotation angle with high accuracy as compared to a wheel speed sensor.

1-2. Rotation Angle Detecting Apparatus

Figure 2:
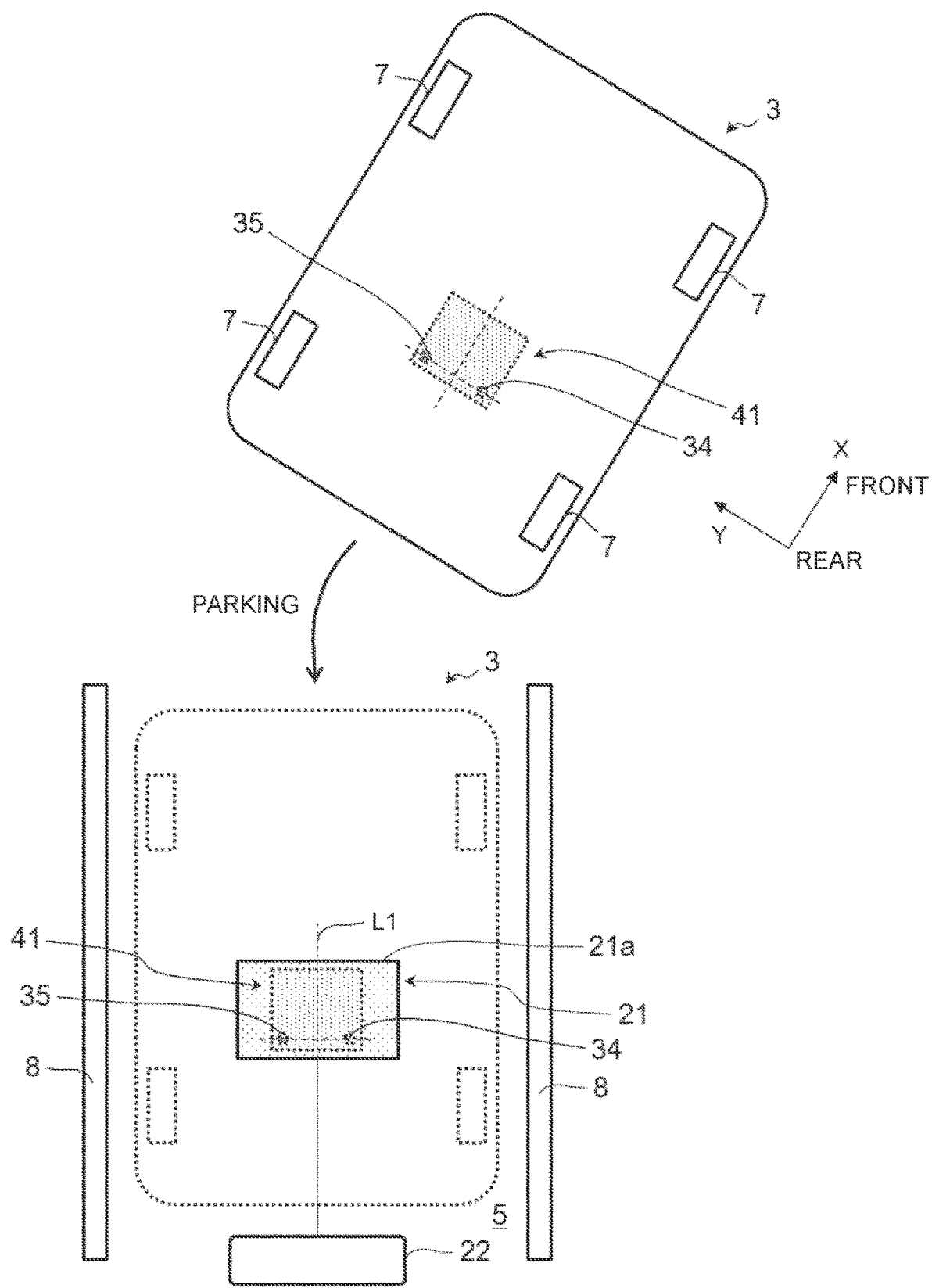
FIG. 2 is a view from above a vehicle approaching a parking space in a vertical direction (Z-axis direction)

FIG. 2 is a view from above the vehicle 3 approaching the parking space 5 in the vertical direction (Z-axis direction). The reference sign 8 indicates a parking lot line that defines the parking space 5. A longitudinal axis, a transverse axis, and a vertical axis of the vehicle 3 are respectively referred to as X-axis, Y-axis, and Z-axis (see FIG. 2 and FIG. 5 and the like (described later)). More specifically, FIG. 2 shows back end parking as an example; however, a method of calculating a yaw angle α, which will be described below, is also applicable to front end parking.

In a system that performs noncontact charging as in the case of the power transmission and receiving system 1, the relative position and relative rotation angle of the in-vehicle unit with respect to the ground unit are required to be accurately detected at the time of transmitting and receiving electric power in a noncontact manner. This is to determine whether each of the relative position and the relative rotation angle falls within a range in which noncontact charging is possible. Specifically, the relative position includes an X-axis direction position, a Y-axis direction position, and a Z-axis direction position, and the relative rotation angle includes a yaw angle α (a rotation angle about the Z-axis), a roll angle β (a rotation angle about the X-axis), and a pitch angle γ (a rotation angle about the Y-axis).

Figure 3A:
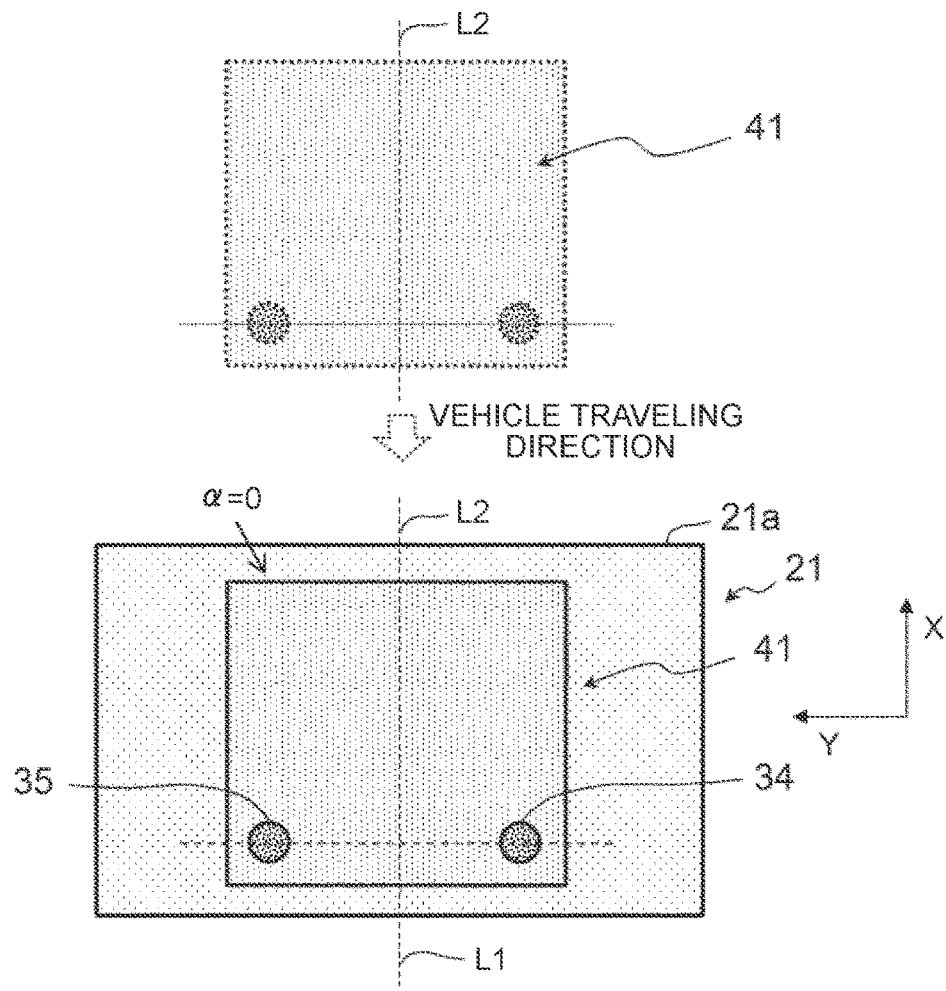
FIG. 3A is a view for illustrating the definition of a yaw angle of an in-vehicle unit with respect to a ground unit.
Figure 3B:
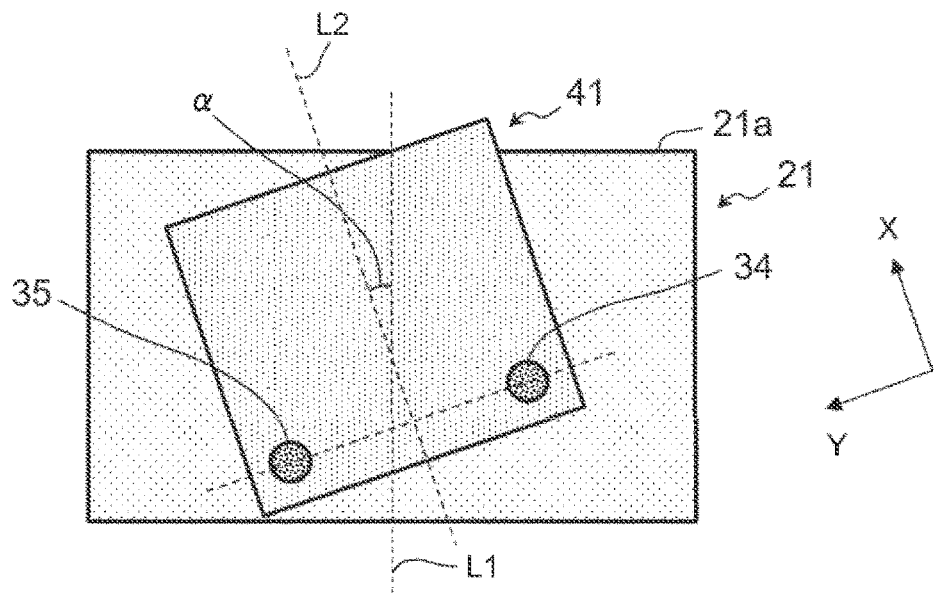
FIG. 3B is a view for illustrating the definition of a yaw angle of an in-vehicle unit with respect to a ground unit.

The definition of the yaw angle α of the in-vehicle unit 41 with respect to the ground unit 21 will be described with reference to FIG. 3A and FIG. 3B. FIG. 3A and FIG. 3B are also views of the ground unit 21 and the in-vehicle unit 41 when viewed in the Z-axis direction as in the case of FIG. 2. When the vehicle 3 is properly parked in the parking space 5 as represented by the dashed line in FIG. 2, the longitudinal axis (X-axis) of the vehicle 3 is parallel to the parking lot line 8. Here, to determine the yaw angle α of the in-vehicle unit 41 with respect to the ground unit 21, an axis parallel to the parking lot line 8 in an XY-plane is used as a reference axis L1 of the ground unit 21. An axis parallel to the X-axis (longitudinal axis) of the vehicle 3 is used as a reference axis L2 of the in-vehicle unit 41.

In the example shown in FIG. 3A, the vehicle 3 is parked in a state where the longitudinal axis (X-axis) is parallel to the parking lot line 8. In this case, the reference axis L1 and the reference axis L2 are parallel to each other, so the yaw angle α is zero. On the other hand, in the example shown in FIG. 3B, the reference axis L2 is inclined with respect to the reference axis L1. Therefore, the inclination angle of the reference axis L2 with respect to the reference axis L1 is determined as the yaw angle α.

1-2-1. Configuration Example of Rotation Angle Detecting Apparatus

Figure 4:
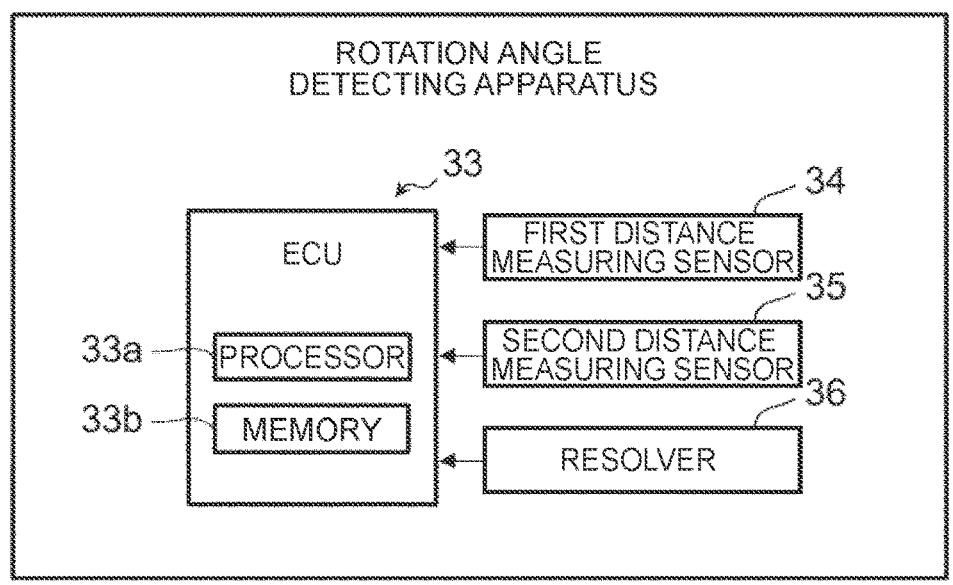
FIG. 4 is a block diagram showing the configuration of the rotation angle detecting apparatus according to the first embodiment.

In the present embodiment, a method of detecting the yaw angle α of the relative position and relative rotation angle will be described. FIG. 4 is a block diagram showing the configuration of the rotation angle detecting apparatus 50 according to the first embodiment. The rotation angle detecting apparatus 50 is made up of the ECU 33, the first and second distance measuring sensors 34, 35, and the resolver 36.

Figure 5:
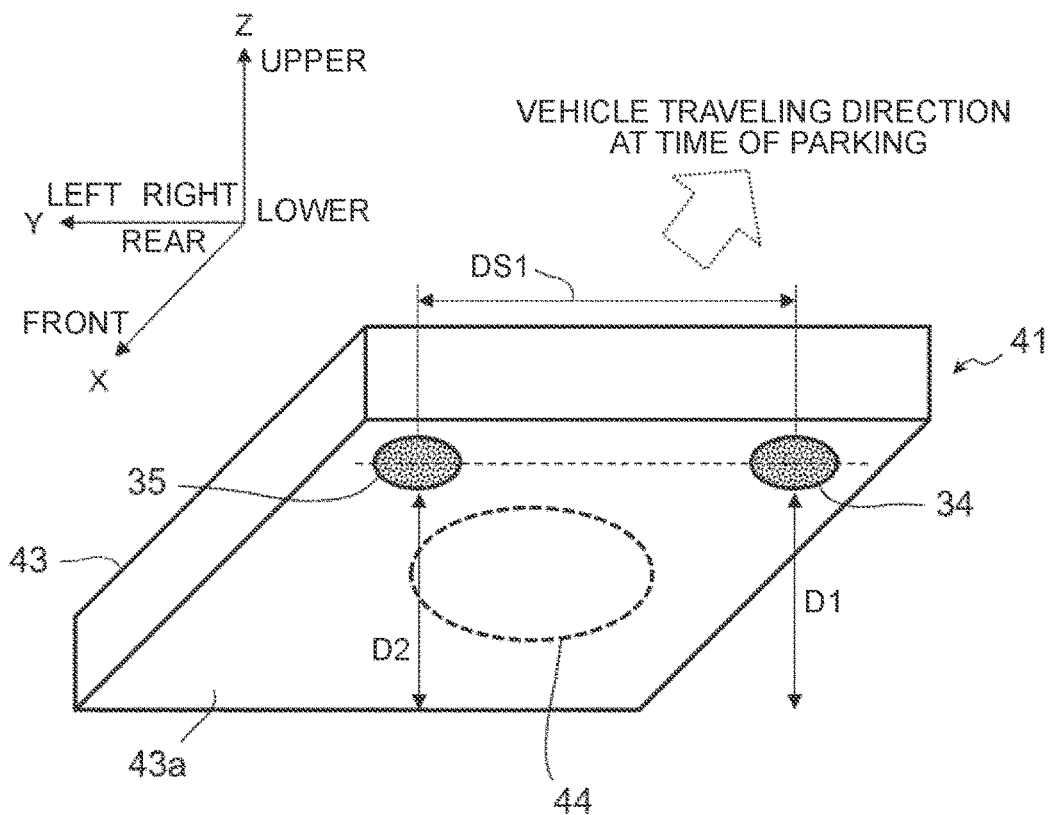
FIG. 5 is a perspective view of the in-vehicle unit shown in FIG. 1 when viewed from a lower side in the vertical direction of the vehicle.

FIG. 5 is a perspective view of the in-vehicle unit 41 shown in FIG. 1 when viewed from the lower side of the vehicle 3 in the vertical direction. A bottom surface 43a of the case 43 of the in-vehicle unit 41 faces the road surface 6 or the ground unit 21. As shown in FIG. 5, the in-vehicle unit 41 is mounted on the vehicle 3 such that the bottom surface 43a is parallel to the XY-plane.

The first distance measuring sensor 34 is installed in the in-vehicle unit 41 so as to face downward in the Z-axis direction, that is, so as to face the road surface 6 and detects a distance D1 to the road surface 6. The second distance measuring sensor 35 is installed in the in-vehicle unit 41 so as to face downward in the Z-axis direction, that is, so as to face the road surface 6 and detects a distance D2 to the road surface 6. The first distance measuring sensor 34 and the second distance measuring sensor 35 are disposed so as to be arranged in a right and left direction (Y-axis direction) of the vehicle 3.

More specifically, the distance between the first distance measuring sensor 34 and the second distance measuring sensor 35 (hereinafter, referred to as sensor-to-sensor distance DS1) is set so as to be shorter than the width of the ground unit 21 in a direction perpendicular to the reference axis L1. Thus, except when the vehicle 3 is parked so as to significantly deviate in the direction perpendicular to the reference axis L1 with respect to the ground unit 21, each of the distance measuring sensors 34, 35 is able to face the road surface 6 at a location at which each of the distance measuring sensors 34, 35 is able to face the ground unit 21 at the time of parking.

As the first distance measuring sensor 34 reaches just above the ground unit 21 at the time of parking, the distance D1 detected by the first distance measuring sensor 34 changes from a distance from the road surface 6 to a distance from the ground unit 21. Therefore, by measuring the distance D1 with the first distance measuring sensor 34 during parking, the timing at which the first distance measuring sensor 34 begins to face the ground unit 21 can be detected. In other words, the step 27 can be detected. This also applies to the second distance measuring sensor 35.

In the example shown in FIG. 5, the first and second distance measuring sensors 34, 35 are installed in the in-vehicle unit 41. However, as long as the first and second distance measuring sensors 34, 35 are mounted on the vehicle 3 so as to face the road surface 6 at locations at which the first and second distance measuring sensors 34, 35 are able to face the ground unit 21 at the time of parking, the first and second distance measuring sensors 34, 35 may be installed at the bottom surface of the vehicle 3 in an area other than the in-vehicle unit 41. In addition, as shown in FIG. 3A and FIG. 3B, when viewed from above in the Z-axis direction, the dimensions of the in-vehicle unit 41 in the direction of the reference axis L1 and the direction perpendicular to the reference axis L1 are respectively shorter than the dimensions of the ground unit 21 as an example.

1-2-2. Outline of Method of Calculating Yaw Angle α

Figure 6A:
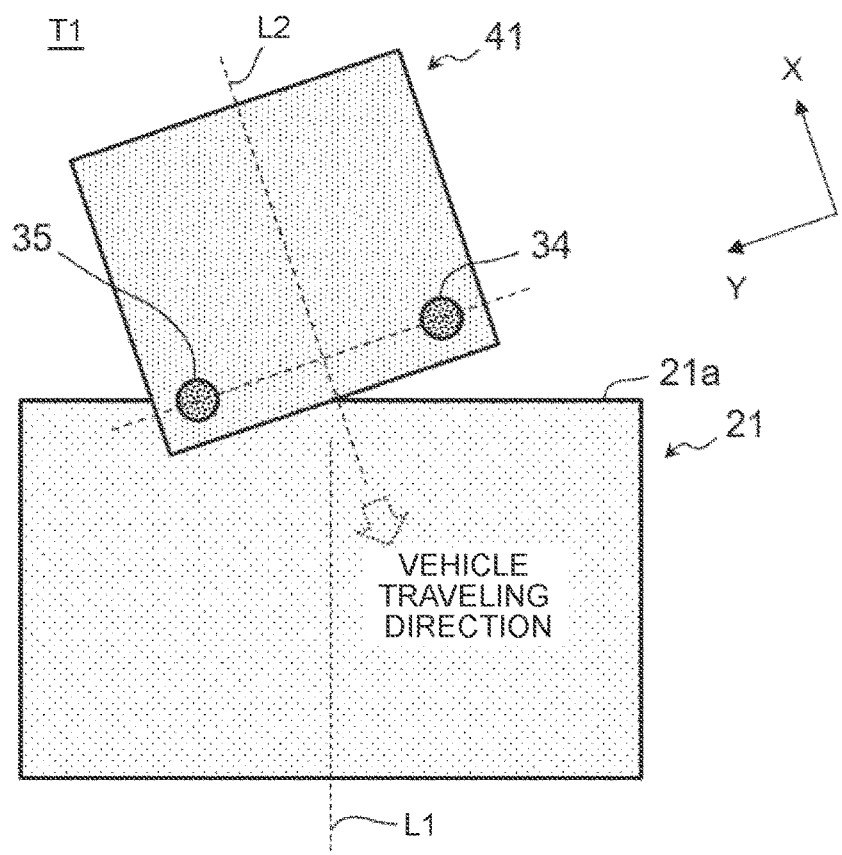
FIG. 6A is a view for illustrating the outline of a method of calculating a yaw angle according to the first embodiment.
Figure 6B:
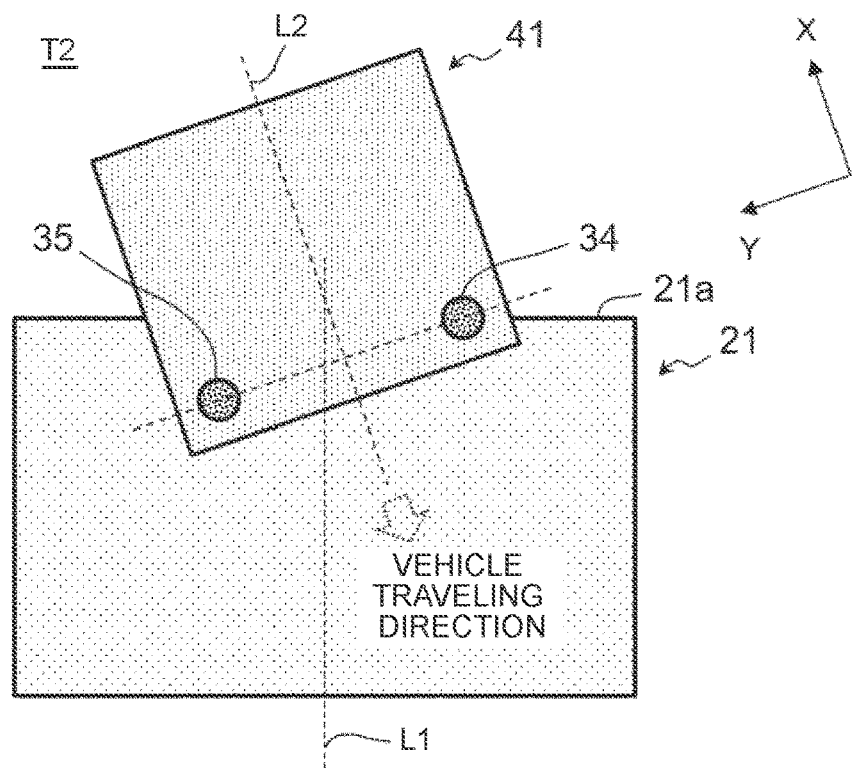
FIG. 6B is a view for illustrating the outline of a method of calculating a yaw angle according to the first embodiment.
Figure 7:
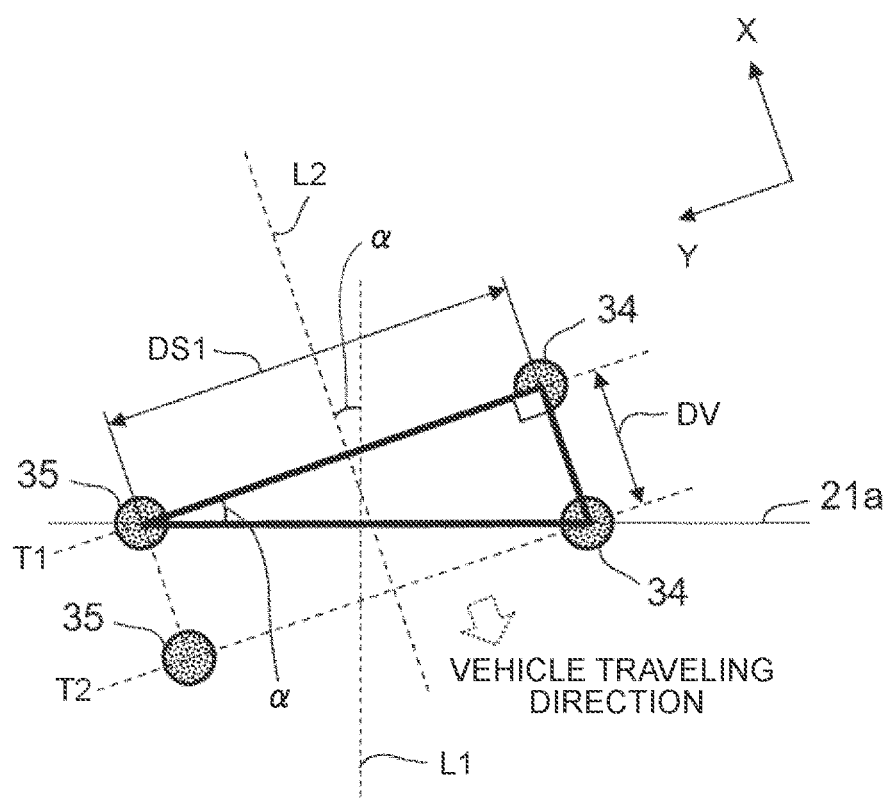
FIG. 7 is a view for illustrating the outline of a method of calculating a yaw angle according to the first embodiment.

FIG. 6A, FIG. 6B, and FIG. 7 are views for illustrating the outline of a method of calculating a yaw angle α according to the first embodiment. The drawings are also views of the ground unit 21 and the in-vehicle unit 41 when viewed in the Z-axis direction. The drawings show the vehicle being parked in a state where the vehicle-side reference axis L2 is inclined with respect to the ground-side reference axis L1.

The shape of the case 23 of the ground unit 21, which is a precondition to calculate a yaw angle α, will be described. As shown in FIG. 6A and FIG. 6B, the basic shape of the case 23 is a rectangular shape as an example. On this precondition, to calculate the yaw angle α, a side 21a of the case 23, facing toward the vehicle 3 (in-vehicle unit 41) that approaches the ground unit 21, has a linear shape. More specifically, the side 21a has a linear shape extending in the direction perpendicular to the reference axis L1.

In relation to calculation of the yaw angle α, the linear shape of the side 21a is not necessarily limited to an example having a strict linear shape and is a concept including an example having a substantially linear shape. In an example of a parking space in which the vehicle 3 is able to approach the ground unit 21 to park from both sides of the reference axis L1, to detect the yaw angle α at the time of parking from both sides, the case 23 of the ground unit 21 installed in the parking space may have a side opposite to the side 21a and having a linear shape as well as the side 21a. As long as the case 23 has a linear side 21a described here, the case 23 may have any basic shape other than a rectangular shape.

FIG. 6A corresponds to a first timing T1 at which the second distance measuring sensor 35 begins to face the ground unit 21. The first timing T1 can be detected based on a change of the distance D2 resulting from passage of the second distance measuring sensor 35 through the side 21a (the step 27). As the vehicle 3 continues moving after the first timing T1, a second timing T2 at which the first distance measuring sensor 34 begins to face the ground unit 21 as shown in FIG. 6B comes. The second timing T2 can be detected based on a change of the distance D1 resulting from passage of the first distance measuring sensor 34 through the side 21a (the step 27).

FIG. 7 is a view showing the relationship between the location of each of the first and second distance measuring sensors 34, 35 at each of the first timing T1 and the second timing T2 in FIG. 6A and FIG. 6B and the location of the ground unit 21 (the side 21a). The ECU 33 is able to calculate a moving distance DV of the vehicle 3 during a period from the first timing T1 to the second timing T2 based on the output signal of the resolver 36. The sensor-to-sensor distance DS1 is a known value. The direction of a straight line connecting the first and second distance measuring sensors 34, 35 (that is, the Y-axis direction) and a traveling direction (that is, the X-axis direction) of the vehicle 3 are perpendicular to each other.

Therefore, as represented by the wide line in FIG. 7, a right angled triangle having a side of which the length is the sensor-to-sensor distance DS1 and a side of which the length is the moving distance DV together with a hypotenuse can be determined. In the right angled triangle, an interior angle opposite to the side of which the length is the moving distance DV is equal to an angle formed between the ground-side reference axis L1 and the vehicle-side reference axis L2, that is, the yaw angle α. Therefore, an arc tangent value of a value obtained by dividing the moving distance DV by the sensor-to-sensor distance DS1 can be calculated as the yaw angle α based on the following expression (1).

$$\alpha = \arctan(DV/DS1) \tag{1}$$

1-2-3. Process Executed by ECU

Figure 8:
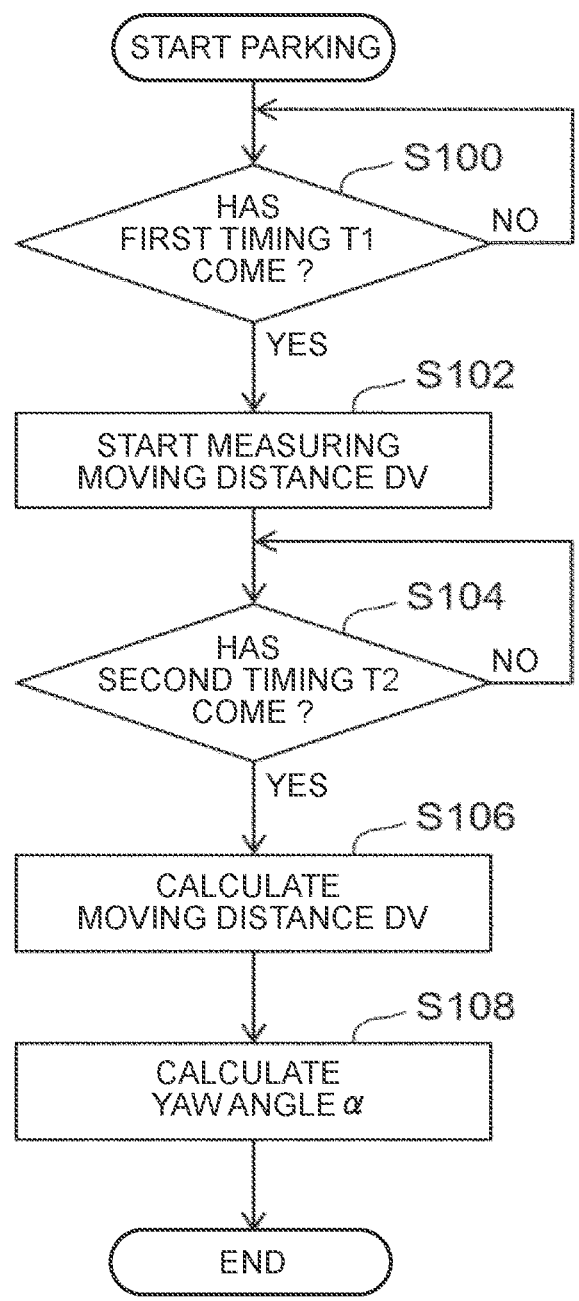
FIG. 8 is a flowchart showing the flow of a process related to detecting a yaw angle according to the first embodiment.

FIG. 8 is a flowchart showing the flow of a process related to detecting the yaw angle α according to the first embodiment. The process of the flowchart is executed when the vehicle 3 starts parking. Specifically, in an example in which the vehicle 3 is parked by driver's operation, the ECU 33 determines that parking is started when, for example, operation of a predetermined switch to inform a parking start by the driver is detected. Alternatively, the ECU 33 determines that parking is started when, for example, the parking space 5 is detected by using a camera image while the vehicle 3 is backing up. In an example in which the vehicle 3 has an automatic parking function, the ECU 33 determines that parking is started when, for example, operation of a switch to select the automatic parking function by the driver is detected.

In FIG. 8, the ECU 33 (processor 33*a*) initially determines in step S100 whether the first timing T1 has come. The first timing T1 is a timing at which one of the first and second distance measuring sensors 34, 35 begins to face the ground unit 21. As described above, the first timing T1 can be acquired based on a change of an output signal (the distance D1 or the distance D2) of the first distance measuring sensor 34 or the second distance measuring sensor 35.

While the first timing T1 has not come yet in step S100, the ECU 33 repeatedly executes the process of step S100. When the first timing T1 does not come within a predetermined time after the start of the process of step S100, the ECU 33 may cancel the process of detecting the yaw angle α at the current parking start.

On the other hand, when the first timing T1 has come in step S100, the process proceeds to step S102. In step S102, the ECU 33 starts measuring the moving distance DV of the vehicle 3, that is, measuring the rotation amount of the rotary shaft of the electric motor 31, with the resolver 36. After that, the process proceeds to step S104.

In step S104, the ECU 33 determines whether the second timing T2 has come. The second timing T2 is a timing at which the distance measuring sensor different from the one of the first and second distance measuring sensors 34, 35, which has begun to face the ground unit 21 at the first timing T1, begins to face the ground unit 21. The second timing T2, as well as the first timing T1, can be acquired based on a change of an output signal (the distance D1 or the distance D2) of the first distance measuring sensor 34 or the second distance measuring sensor 35.

While the second timing T2 has not come yet in step S104, the ECU 33 repeatedly executes the process of step S104. When the second timing T2 does not come within a predetermined time after the start of the process of step S104, the ECU 33 may cancel the process of detecting the yaw angle α at the current parking start.

On the other hand, when the second timing T2 has come in step S104, the process proceeds to step S106. In step S106, the ECU 33 calculates a moving distance DV during a period from the first timing T1 to the second timing T2 based on the output signal (more specifically, the measured rotation amount) of the resolver 36. After that, the process proceeds to step S108.

In step S108, the ECU 33 calculates an arc tangent value (=arctan(DV/DS1)) of a value obtained by dividing the moving distance DV calculated in step S106 by the known sensor-to-sensor distance DS1 as the yaw angle α.

Figure 9:
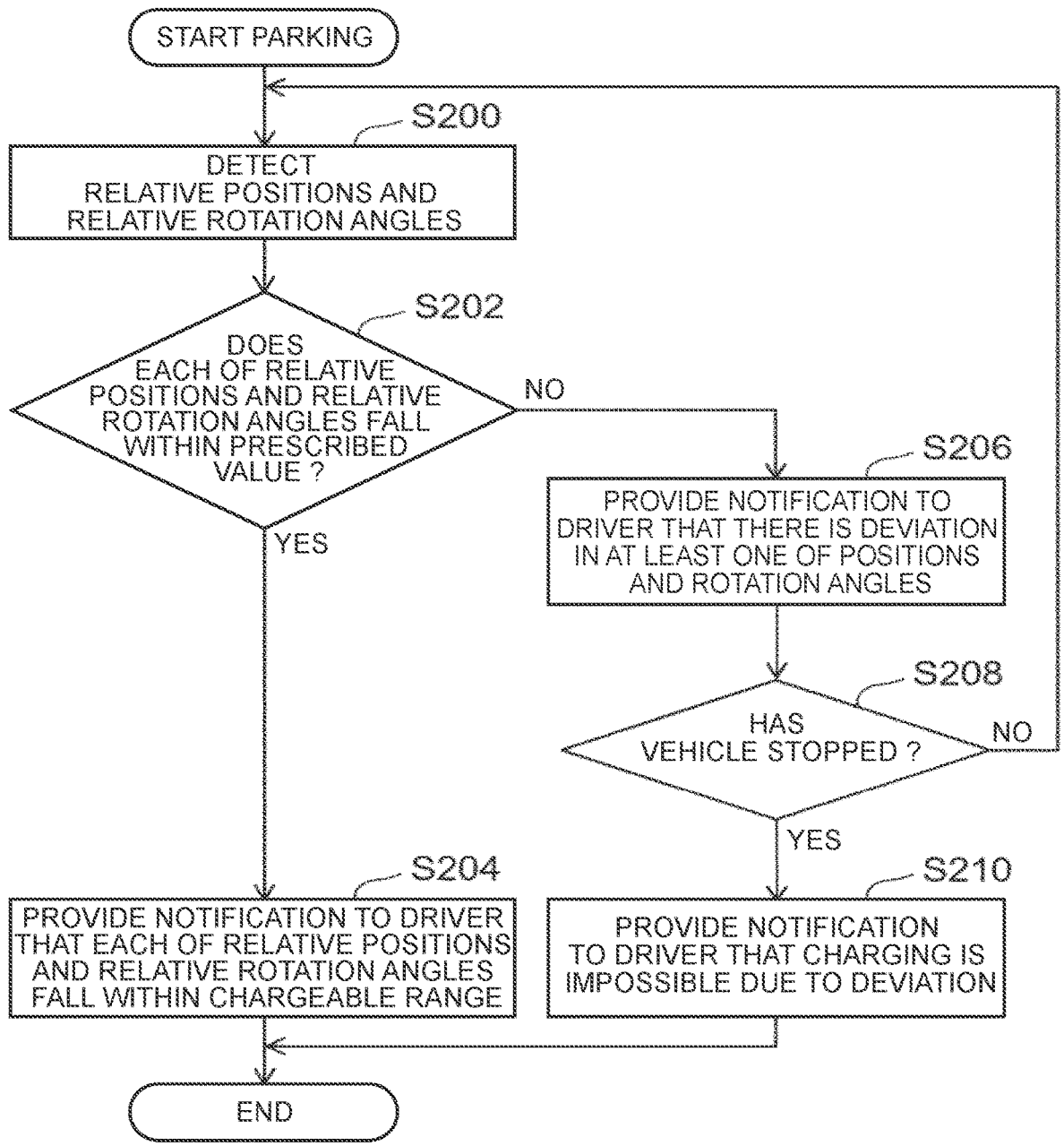
FIG. 9 is a flowchart showing the flow of a process related to a notification to a driver according to deviation amounts of a relative position and relative rotation angle of the in-vehicle unit with respect to the ground unit.

FIG. 9 is a flowchart showing the flow of a process related to a notification to the driver according to deviation amounts of the relative position and relative rotation angle of the in-vehicle unit 41 with respect to the ground unit 21. The process of the flowchart is also executed when the vehicle 3 starts parking as in the case of FIG. 8.

In FIG. 9, the ECU 33 (processor 33*a*) initially detects various relative positions (X-axis direction position, Y-axis direction position, and Z-axis direction position) and relative rotation angles (yaw angle α, roll angle β, and pitch angle γ) in step S200. Specifically, the yaw angle α is detected by the process of the flowchart shown in FIG. 8. The roll angle β and the pitch angle γ can be detected by a method that will be described in a second embodiment (described later). For example, the distance D1 detected by using the first distance measuring sensor 34, the distance D2 detected by using the second distance measuring sensor 35, or an average value of the distance D1 and the distance D2 may be used as the Z-axis direction position. The X-axis direction position and the Y-axis direction position can be detected by using any known method.

In step S202 subsequent to step S200, the ECU 33 determines whether each of the various relative positions and relative rotation angles detected in step S200 falls within a predetermined prescribed value (that is, within a range in which noncontact charging can be performed).

When the determination result of step S202 is affirmative, the process proceeds to step S204. In step S204, the ECU 33 executes a process of providing a notification to the driver that the in-vehicle unit 41 falls within the range in which noncontact charging can be performed with respect to the ground unit 21. Specifically, the ECU 33, for example, provides a notification by using a display device 37 installed in an instrument panel of the vehicle 3.

On the other hand, when the determination result of step S202 is negative, the process proceeds to step S206. In step S206, the ECU 33, for example, executes a process of providing a notification to the driver by using the display device 37 that there is a deviation in at least any one of the relative positions and the relative rotation angles.

In step S208 subsequent to step S206, the ECU 33 determines whether the vehicle 3 has stopped (in other words, whether the driver has stopped parking operation). The determination can be performed based on, for example, whether a change of the rotation angle detected by the resolver 36 has stopped.

When the vehicle 3 has not stopped yet in step S208, that is, when parking operation is being performed again, the process returns to step S200. On the other hand, when the vehicle 3 has stopped, the process proceeds to step S210. In step S210, the ECU 33 executes a process of providing a notification to the driver by using, for example, the display device 37 that noncontact charging is impossible due to a deviation of any one of the relative positions and the relative rotation angles.

1-3. Advantageous Effects

With the rotation angle detecting apparatus 50 according to the first embodiment, the yaw angle α of the in-vehicle unit 41 with respect to the ground unit 21 can be detected with the use of a simple configuration made up of the pair of distance measuring sensors 34, 35 and the resolver 36 existing in the vehicle 3.

The resolver 36 is used to calculate the moving distance DV of the vehicle 3. The resolver 36 is a rotation angle sensor for detecting a rotation angle required to control the electric motor 31, so the resolver 36 is existing in the vehicle 3 and is highly accurate. Therefore, the moving distance DV can be accurately calculated without addition of any component.

In addition, the method of detecting the yaw angle α according to the present embodiment uses the first and second distance measuring sensors 34, 35 and the resolver 36 and does not need to generate a magnetic field to detect the yaw angle α. The first and second distance measuring sensors 34, 35 and the resolver 36 are independent of the power receiving circuit 42. Therefore, a deviation of the yaw angle α of the vehicle 3, which can occur due to some reasons, such as being pushed by another vehicle after parking, can be detected during charging. Detecting the roll angle β and the pitch angle γ with the method described in the next second embodiment can also be performed similarly.

The first and second distance measuring sensors 34, 35 are able to detect the Z-axis direction position as described in relation to the process of step S200. Therefore, the first and second distance measuring sensors 34, 35 can be used to detect a vehicle height not only at the time of parking but also during charging or another usage. For example, a change in vehicle height can be detected as a result of getting on or off of a person or loading or unloading of baggage. The fact that the vehicle height (relative position in the Z-axis direction) deviates from a prescribed value can be detected by using the first distance measuring sensor 34 or the second distance measuring sensor 35 during charging, and charging can be stopped.

2. Second Embodiment

In the second embodiment, the power transmission and receiving system 1 for a vehicle includes the following rotation angle detecting apparatus 60 instead of the rotation angle detecting apparatus 50. The rotation angle detecting apparatus 60 calculates the roll angle β and the pitch angle γ in addition to the yaw angle α described in the first embodiment as the relative rotation angles of the in-vehicle unit 41 with respect to the ground unit 21.

2-1. Configuration Example of Rotation Angle Detecting Apparatus

Figure 10:
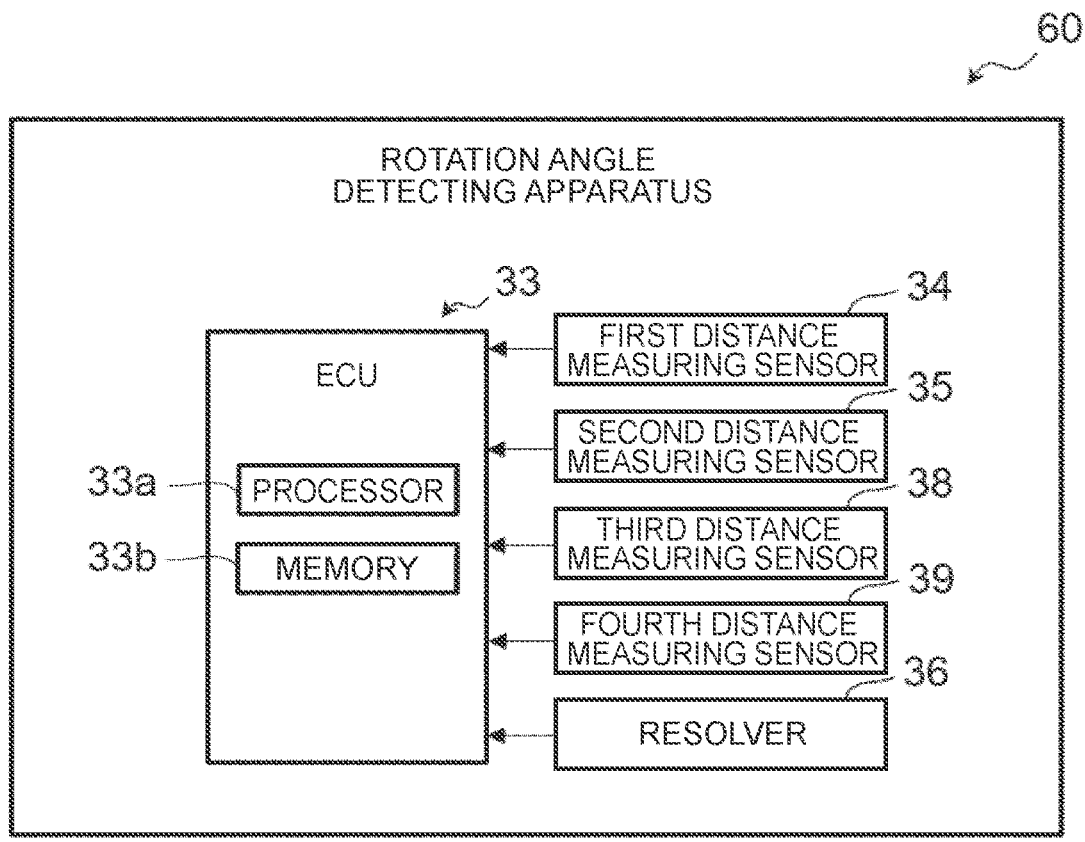
FIG. 10 is a block diagram showing the configuration of a rotation angle detecting apparatus according to a second embodiment.

FIG. 10 is a block diagram showing the configuration of the rotation angle detecting apparatus 60 according to the second embodiment. The rotation angle detecting apparatus 60 includes third and fourth distance measuring sensors 38, 39 in addition to the ECU 33, the first and second distance measuring sensors 34, 35, and the resolver 36.

Figure 11:
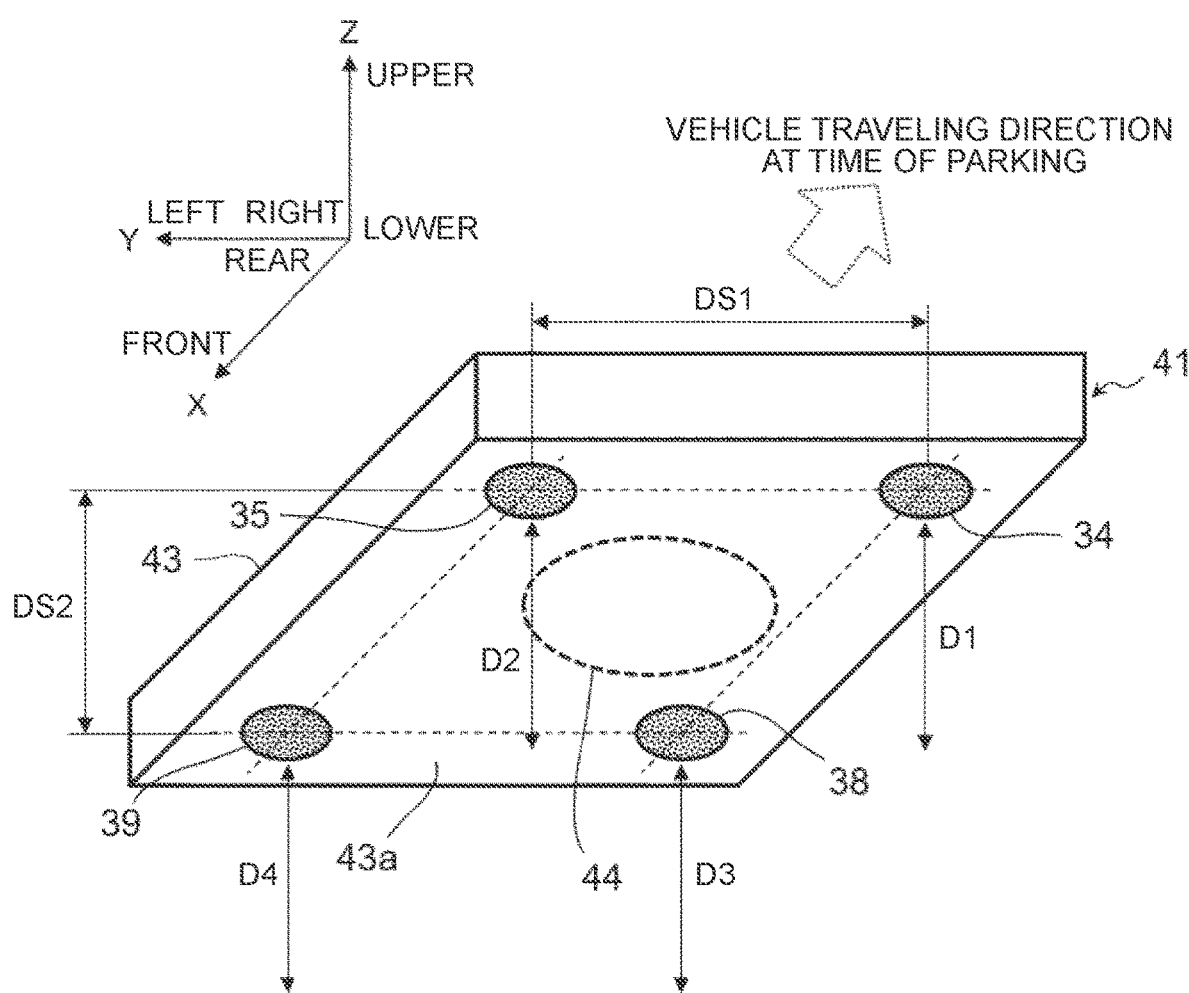
FIG. 11 is a view for illustrating locations where third and fourth distance measuring sensors shown in FIG. 10 are disposed.

FIG. 11 is a view for illustrating locations where the third and fourth distance measuring sensors 38, 39 shown in FIG. 10 are disposed. FIG. 11 is a perspective view of the in-vehicle unit 41 when viewed from the lower side in the vertical direction of the vehicle 3.

The disposition of the first and second distance measuring sensors 34, 35 is the same as that of the first embodiment. Next, each of the third and fourth distance measuring sensors 38, 39, as well as the distance measuring sensors 34, 35, is installed in the in-vehicle unit 41 so as to face downward in the Z-axis direction, that is, to face the road surface 6. In other words, since the third and fourth distance measuring sensors 38, 39 are mounted on the in-vehicle unit 41 able to face the ground unit 21, the third and fourth distance measuring sensors 38, 39 are able to face the ground unit 21 at the time of parking. The third and fourth distance measuring sensors 38, 39 respectively detect a distance D3 and a distance D4 from the road surface 6. More specifically, the first, second, third, and fourth distance measuring sensors 34, 35, 38, 39 are installed at the bottom surface 43a of the case 43 of the in-vehicle unit 41.

The third distance measuring sensor 38 and the fourth distance measuring sensor 39 are disposed so as to be arranged in the right and left direction (Y-axis direction) of the vehicle 3. The third distance measuring sensor 38 is disposed apart from the first distance measuring sensor 34 by a sensor-to-sensor distance DS2 in the front and rear direction (X-axis direction) of the vehicle 3. Similarly, the fourth distance measuring sensor 39 is disposed apart from the second distance measuring sensor 35 by the sensor-to-sensor distance DS2 in the X-axis direction. Therefore, the distance between the third distance measuring sensor 38 and the fourth distance measuring sensor 39 is also the sensor-to-sensor distance DS1.

Next, a specific disposition relation among the first, second, third, and fourth distance measuring sensors 34, 35, 38, 39 and the power receiving coil 44 in the example shown in FIG. 11 will be described. As shown in FIG. 11, when the in-vehicle unit 41 is viewed in the direction of the vertical axis (Z-axis) of the vehicle 3, the first, second, third, and fourth distance measuring sensors 34, 35, 38, 39 are disposed so as to surround the power receiving coil 44. In addition, the basic shape of the bottom surface 43a of the case 43 of the in-vehicle unit 41 is a rectangular shape as an example. The first, second, third, and fourth distance measuring sensors 34, 35, 38, 39 are disposed at four corners of the bottom surface 43a.

2-2. Outline of Method of Calculating Roll Angle β and Pitch Angle γ

A method of calculating the roll angle β and the pitch angle γ according to the second embodiment will be described with reference to FIG. 12A to FIG. 13B. A method of calculating the yaw angle α is similar to that of the first embodiment. In other words, the yaw angle α is calculated by using the pair of distance measuring sensors 34, 35. The yaw angle α may be calculated with a similar method by using the pair of distance measuring sensors 38, 39.

Figure 12A:
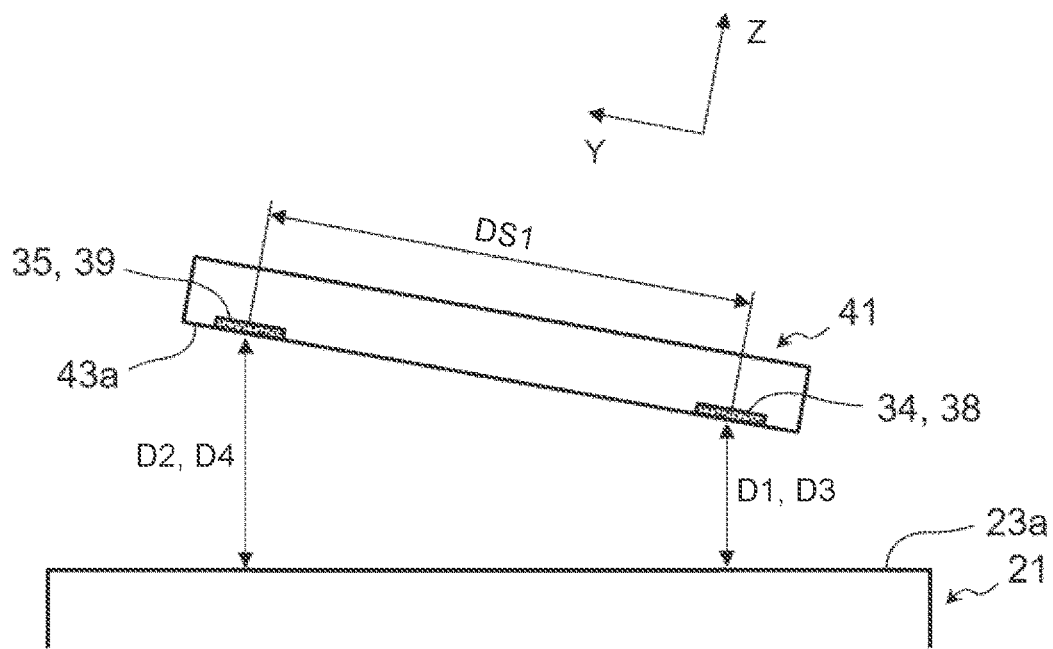
FIG. 12A is a view for illustrating a method of calculating a roll angle according to the second Embodiment.

Initially, a method of calculating the roll angle β will be described. FIG. 12A is a view of the in-vehicle unit 41 when viewed from the rear side of the vehicle 3. In one example shown in FIG. 12A, the in-vehicle unit 41 is located above the ground unit 21 in a state where the right side (right side on the drawing sheet) of the vehicle 3 is inclined downward with respect to the left side. The top surface 23a of the ground unit 21 is parallel or substantially parallel to the road surface 6.

To calculate the roll angle β, the ECU 33 calculates a first difference A1. The first and third distance measuring sensors 34, 38 are on the same straight line parallel to the X-axis. Similarly, the second and fourth distance measuring sensors 35, 39 are also on another same straight line parallel to the X-axis. The first difference A1 is a difference between an average value of the distance D1 and the distance D3 and an average value of the distance D2 and the distance D4.

Figure 12B:
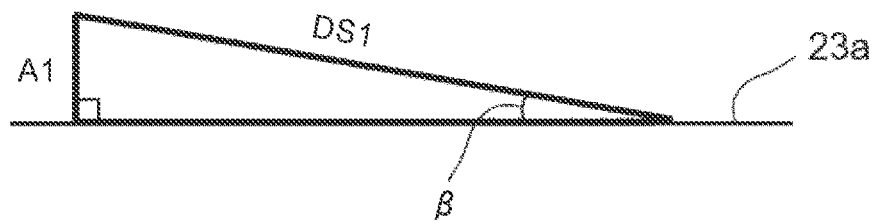
FIG. 12B is a view for illustrating a method of calculating a roll angle according to the second Embodiment.

When the first difference A1 is obtained, a right angled triangle as shown in FIG. 12B is determined. In the right angled triangle, an interior angle facing a side of which the length is the first difference A1 is equal to an angle formed between the ground-side top surface 23a and the vehicle-side bottom surface 43a when viewed in the X-axis direction, that is, the roll angle β. The length of the hypotenuse of the right angled triangle is equal to the sensor-to-sensor distance DS1. Therefore, an arc sine value of a value obtained by dividing the first difference A1 by the sensor-to-sensor distance DS1 can be calculated as the roll angle β based on the following expression (2).

$$\beta = \arcsin(A1/DS1) \quad (2)$$

Figure 13A:
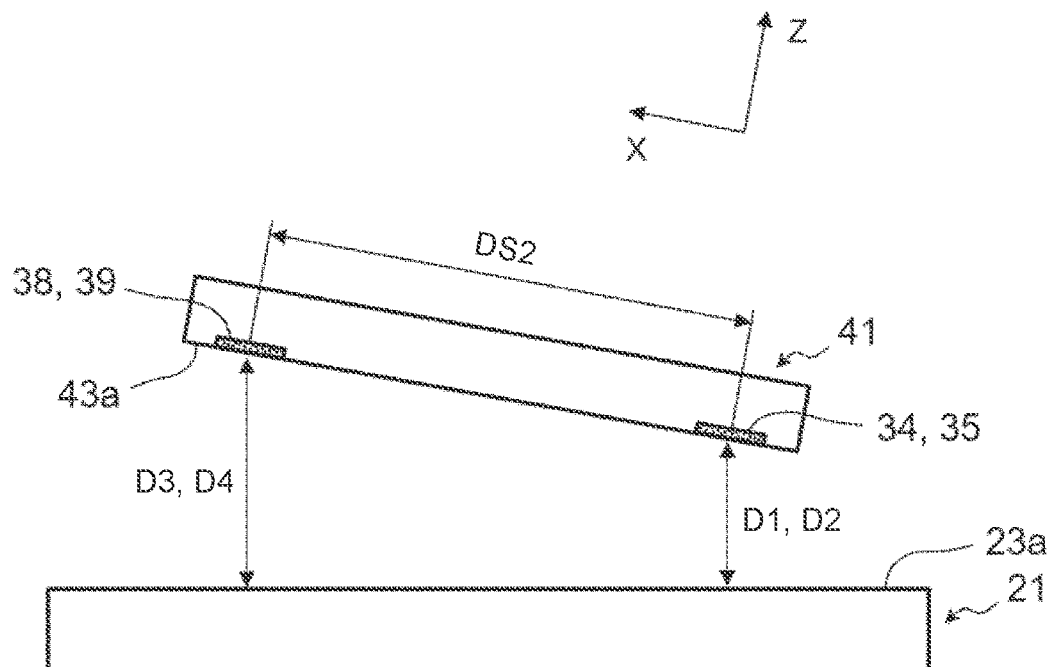
FIG. 13A is a view for illustrating a method of calculating a pitch angle according to the second embodiment.

Next, a method of calculating the pitch angle γ will be described. FIG. 13A is a view of the in-vehicle unit 41 when viewed from the left side of the vehicle 3. In one example shown in FIG. 13A, the in-vehicle unit 41 is located above the ground unit 21 in a state where the rear side (right side on the drawing sheet) of the vehicle 3 is inclined so as to be lower than the front side.

To calculate the pitch angle γ, the ECU 33 calculates a second difference A2. The first and second distance measuring sensors 34, 35 are on the same straight line parallel to the Y-axis. Similarly, the third and fourth distance measuring sensors 38, 39 are also on another same straight line parallel to the Y-axis. The second difference A2 is a difference between an average value of the distance D1 and the distance D2 and an average value of the distance D3 and the distance D4.

Figure 13B:
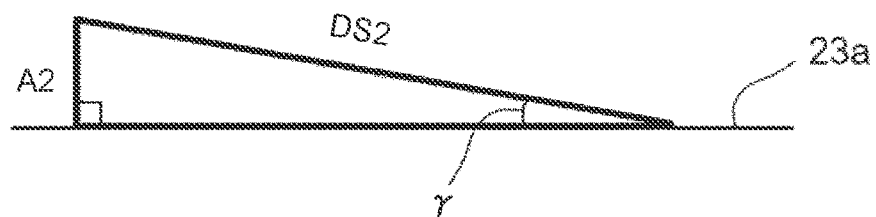
FIG. 13B is a view for illustrating a method of calculating a pitch angle according to the second embodiment.

When the second difference A2 is obtained, a right angled triangle as shown in FIG. 13B is determined. In the right angled triangle, an interior angle facing a side of which the length is the second difference A2 is equal to an angle formed between the ground-side top surface 23a and the vehicle-side bottom surface 43a when viewed in the Y-axis direction, that is, the pitch angle γ. The length of the hypotenuse of the right angled triangle is equal to the sensor-to-sensor distance DS2. Therefore, an arc sine value of a value obtained by dividing the second difference A2 by the sensor-to-sensor distance DS2 can be calculated as the pitch angle γ based on the following expression (3).

$$\gamma = \arcsin(A2/DS2) \quad (3)$$

2-3. Process Executed by ECU

Figure 14:
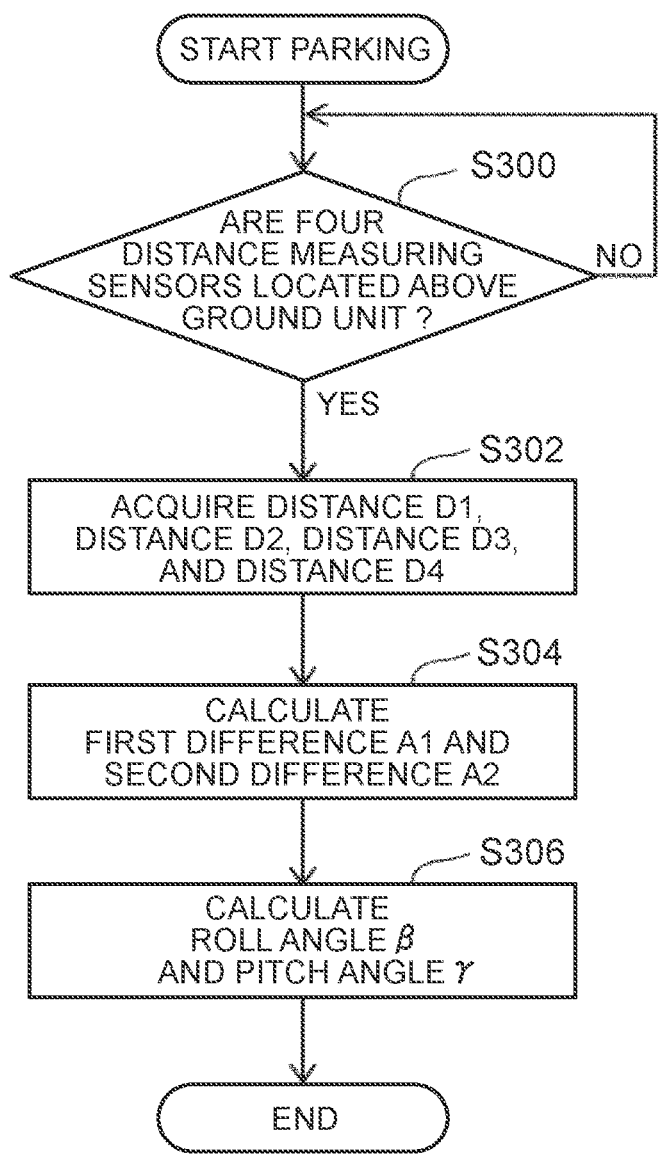
FIG. 14 is a flowchart showing the flow of a process related to detecting a roll angle and a pitch angle according to the second embodiment.

FIG. 14 is a flowchart showing the flow of a process related to detecting the roll angle β and the pitch angle γ according to the second embodiment. The process of the flowchart is also executed when the vehicle 3 starts parking as in the case of FIG. 8.

In FIG. 14, the ECU 33 (processor 33a) initially determines in step S300 whether all the four distance measuring sensors 34, 35, 38, 39 are above the ground unit 21. The determination is performed by, for example, comparing each of the distance D1, the distance D2, the distance D3, and the distance D4 with a threshold.

While the determination result of step S300 is negative, the ECU 33 repeatedly executes the process of step S300. When the determination result is not affirmative within a predetermined time after the start of the process of step S300, the ECU 33 may cancel the process of detecting the roll angle β and the pitch angle γ at the current parking start.

On the other hand, when the determination result of step S300 is affirmative, the process proceeds to step S302. In step S302, the ECU 33 acquires the distance D1, the distance D2, the distance D3, and the distance D4. Subsequently, in step S304, the ECU 33 calculates the first difference A1 and the second difference A2 by using the distance D1, the distance D2, the distance D3, and the distance D4 acquired in step S302.

In step S306 subsequent to step S304, the ECU 33 calculates an arc sine value (=arcsin(A1/DS1)) of a value obtained by dividing the first difference A1 calculated in step S304 by the known sensor-to-sensor distance DS1 as the roll angle β. The ECU 33 calculates an arc sine value (=arcsin (A2/DS2)) of a value obtained by dividing the second difference A2 calculated in step S304 by the known sensor-to-sensor distance DS2 as the pitch angle γ.

2-4. Advantageous Effects

The rotation angle detecting apparatus 60 according to the second embodiment described above additionally includes the pair of distance measuring sensors 38, 39 as compared to the rotation angle detecting apparatus 50 according to the first embodiment in order to detect the roll angle β and the pitch angle γ. In this way, with the rotation angle detecting apparatus 60, not only the yaw angle α but also the roll angle and the pitch angle γ at the time of parking can be suitably detected with the use of a simple configuration. Not only the pair of distance measuring sensors 34, 35 but also the other pair of distance measuring sensors 38, 39 can be used to detect the yaw angle α.

To calculate the first difference A1, one of the distance D1 and the distance D3 may be used. In terms of this point, in the method of calculating the roll angle β according to the present embodiment, an average value of the distance D1 and the distance D3 is used. This also applies to the relationship between the distance D2 and the distance D4. Thus, the first difference A1 can be calculated while the influence of variations of distances respectively detected by the individual distance measuring sensors is reduced. This also applies to calculation of the second difference A2 in the method of calculating the pitch angle γ.

When the in-vehicle unit 41 is viewed in the vertical direction (Z-axis direction) of the vehicle 3, the first, second, third, and fourth distance measuring sensors 34, 35, 38, 39 according to the present embodiment are disposed to surround the power receiving coil 44. Thus, the following advantageous effects are obtained. In other words, at the time of parking, both the roll angle β and the pitch angle γ can occur. In terms of this point, with the disposition of the four distance measuring sensors 34, 35, 38, 39, when the pitch angle γ is occurring, a distance at a location close to the power receiving coil 44 in the front and rear direction of the vehicle 3 can be acquired by using an average value of the distance D1 and the distance D3 as compared to the case where only the distance D1 or the distance D3 is used. In other words, by using the average value, when the pitch angle γ is occurring, the roll angle at a location close to the power receiving coil 44 can be detected. This also applies to the use of an average value of the distance D2 and the distance D4. This also applies to detecting the pitch angle γ.

In the first and second embodiments, the rotation angle detecting apparatus 50 and the rotation angle detecting apparatus 60 each are applied to the noncontact power transmission and receiving system 1 for a vehicle. However, the power transmission and receiving system for a vehicle, to which the rotation angle detecting apparatus according to the disclosure is applied, may be of a contact type. Specifically, a contact power transmission and receiving system may include, for example, an in-vehicle unit including a vehicle-side connector connected to a ground-side connector, and a ground unit including a robot arm that connects the ground-side connector to the vehicle-side connector.

The power transmission and receiving system for a vehicle, to which the rotation angle detecting apparatus according to the disclosure is applied, may be configured such that the in-vehicle unit is a power transmission unit and the ground unit is a power receiving unit, opposite to the example of the power transmission and receiving system 1 for a vehicle.

What is claimed is:

1. A rotation angle detecting apparatus that detects a relative rotation angle of an in-vehicle unit with respect to a ground unit,
   the ground unit being one of a power transmission unit and a power receiving unit and disposed in a parking space,
   the in-vehicle unit being the other one of the power transmission unit and the power receiving unit and mounted on a vehicle at a location at which the in-vehicle unit is able to face the ground unit,
   when the ground unit is viewed from above in a vertical direction, the ground unit having a linear side facing toward the vehicle that approaches the ground unit,
   the rotation angle detecting apparatus comprising:
      a first distance measuring sensor and a second distance measuring sensor mounted on the vehicle so as to be arranged in a right and left direction of the vehicle and to face a road surface at a location at which the first distance measuring sensor and the second distance measuring sensor are able to face the ground unit at a time of parking;

a rotation angle sensor configured to detect a rotation angle of a wheel rotary shaft of the vehicle or a rotation angle of a rotary shaft that rotates with the wheel rotary shaft; and a processor configured to after the vehicle starts parking, acquire a first timing at which one of the first distance measuring sensor and the second distance measuring sensor begins to face the ground unit, based on a change of an output signal of the one of the first distance measuring sensor and the second distance measuring sensor, after the first timing is acquired, acquire a second timing at which the other one of the first distance measuring sensor and the second distance measuring sensor begins to face the ground unit, based on a change of an output signal of the other one of the first distance measuring sensor and the second distance measuring sensor, calculate a moving distance of the vehicle during a period from the first timing to the second timing based on an output signal of the rotation angle sensor, and calculate an arc tangent value of a value obtained by dividing the calculated moving distance by a distance between the first distance measuring sensor and the second distance measuring sensor as a yaw angle, the yaw angle being a rotation angle of the in-vehicle unit with respect to the ground unit about a vertical axis of the vehicle.

2. The rotation angle detecting apparatus according to claim 1, wherein the first distance measuring sensor and the second distance measuring sensor are installed in the in-vehicle unit.

3. The rotation angle detecting apparatus according to claim 2, further comprising a third distance measuring sensor and a fourth distance measuring sensor arranged in the right and left direction and installed in the in-vehicle unit so as to face the road surface, wherein:

the third distance measuring sensor is disposed apart from the first distance measuring sensor by a predetermined distance in a front and rear direction of the vehicle; and the fourth distance measuring sensor is disposed apart from the second distance measuring sensor by the predetermined distance in the front and rear direction.

4. The rotation angle detecting apparatus according to claim 3, wherein:

the processor is configured to calculate a first difference between an average value of a first distance detected by the first distance measuring sensor and a third distance detected by the third distance measuring sensor and an average value of a second distance detected by the second distance measuring sensor and a fourth distance detected by the fourth distance measuring sensor; and the processor is configured to calculate an arc sine value of a value obtained by dividing the calculated first difference by the distance between the first distance measuring sensor and the second distance measuring sensor as a roll angle that is a rotation angle of the in-vehicle unit with respect to the ground unit about a longitudinal axis of the vehicle.

5. The rotation angle detecting apparatus according to claim 3, wherein:

the processor is configured to calculate a second difference between an average value of a first distance detected by the first distance measuring sensor and a second distance detected by the second distance measuring sensor and an average value of a third distance detected by the third distance measuring sensor and a fourth distance detected by the fourth distance measuring sensor; and the processor is configured to calculate an arc sine value of a value obtained by dividing the calculated second difference by a distance between the first distance measuring sensor and the third distance measuring sensor as a pitch angle that is a rotation angle of the in-vehicle unit with respect to the ground unit about a transverse axis of the vehicle.

6. The rotation angle detecting apparatus according to claim 4, wherein:

the in-vehicle unit includes a power transmission coil or a power receiving coil for transmitting or receiving electric power to or from the ground unit in a noncontact manner; and when the in-vehicle unit is viewed in a direction of the vertical axis, the first distance measuring sensor, the second distance measuring sensor, the third distance measuring sensor, and the fourth distance measuring sensor are disposed so as to surround the power transmission coil or the power receiving coil disposed in the in-vehicle unit.

7. The rotation angle detecting apparatus according to claim 1, wherein the rotation angle sensor is a resolver configured to detect a rotation angle of a rotary shaft of an electric motor that drives the vehicle.

8. A power transmission and receiving system for a vehicle, the power transmission and receiving system comprising the rotation angle detecting apparatus according to claim 1.

9. The power transmission and receiving system according to claim 8, wherein the power transmission and receiving system is configured to transmit or receive electric power between the power transmission unit and the power receiving unit in a noncontact manner.

* * * * *